United States Patent [19]

Rosier

[11] 3,913,079

[45] Oct. 14, 1975

[54] MAGNETIC BUBBLE DOMAIN PUMP SHIFT REGISTER

[75] Inventor: Laurence L. Rosier, San Jose, Calif.

[73] Assignee: International Business Machines Corporation, Armonk, N.Y.

[22] Filed: Jan. 2, 1974

[21] Appl. No.: 429,602

[52] U.S. Cl. ...................... 340/174 TF; 340/174 SR

[51] Int. Cl.$^2$ ................... G11C 11/14; G11C 19/08

[58] Field of Search ................. 340/174 TF, 174 SR

[56] References Cited

UNITED STATES PATENTS

| | | | |
|---|---|---|---|
| 3,508,225 | 4/1970 | Smith | 340/174 TF |
| 3,540,021 | 11/1970 | Bobeck et al. | 340/174 TF |
| 3,676,870 | 7/1972 | Bobeck | 340/174 TF |
| 3,735,145 | 5/1973 | Heinz | 340/174 TF |
| 3,810,133 | 5/1974 | Bobeck et al. | 340/174 TF |
| 3,813,661 | 5/1974 | Danylchuk et al. | 340/174 TF |
| 3,821,725 | 6/1974 | Kita et al. | 340/174 TF |
| 3,836,895 | 9/1974 | DeJonge | 340/174 TF |
| 3,863,234 | 1/1975 | Semon et al. | 340/174 TF |

*Primary Examiner*—Stanley M. Urynowicz, Jr.
*Attorney, Agent, or Firm*—Jackson E. Stanland

[57] ABSTRACT

A propagation means for moving interactive elements, such as magnetic bubble domains in a magnetic medium, which comprises a very simple structure that can be used under many bias field conditions. A confinement means serves to constrain the movement of bubble domains to a single dimension, the bubble domains being close enough to each other to interact with one another. A pump means associated with the confinement means produces a magnetic field to expand some of the bubble domains within the confinement means. Expansion of some of the domains causes increased forces on other domains within the confinement means, thereby moving these other domains. When the expansion of the domains is terminated, the expanded domains will shrink which will result in a net displacement of other bubble domains into the area previously occupied by the expanded domains. Thus, movement of domains within the confinement means occurs. Associated structure is used to pulse domains within the confinement means and to generate domains within the confinement means. Additionally, means are provided for putting bubble domains within the confinement means and for removing bubble domains from within the confinement means. This pump propagation structure has particular utility for use with a bubble domain lattice file where the bias field conditions are similar to that required in the pump shift register.

30 Claims, 16 Drawing Figures

| | | BUBBLE POSITION | | |
|---|---|---|---|---|
| | | A | B | C |
| CONDUCTOR CURRENT | C5 | + | G | G |
| | C6 | G | + | G |
| | C7 | G | G | + |
| | C8 | + | + | + |

MAGNETIC BUBBLE DOMAIN PUMP SHIFT REGISTER

CROSS REFERENCE TO RELATED APPLICATIONS

Copending application Ser. No. 429,601, filed the same day as the present application, shows lattices of interactive elements which can be accessed from interior positions of the lattice, using the present pump propagation means.

BACKGROUND OF THE INVENTION

1. Field of the Invention

This invention relates to novel bubble domain propagation techniques, and more particularly to a technique for moving bubble domains which does not require extensive bias fields for stabilization of bubbble domain diameters.

2. Description of the Prior Art

Copending application Ser. No. 395,336, filed Sept. 7, 1973, relates to various systems using lattice arrays of interactive elements. In particular, lattice arrays of magnetic bubble domains are provided for information handling systems. These bubble domains are confined within limited regions of the magnetic bubble domain material and are brought closely enough together that they interact with one another. These interactions determine the positions of individual domains within the confined array. Thus, a high density apparatus is obtained which has particular utility in a number of systems. In one such system, the bubble domains are coded in terms of their magnetic properties for storage of information.

Copending application Ser. No. 395,336 shows various techniques for putting bubble domains into the confined lattice array and for removing bubble domains from the confined array. Additionally, various techniques are shown for coding magnetic bubble domains when information storage is desired.

Since a lattice of magnetic bubble domains is stable over larger ranges of magnetic bias field normal to the magnetic medium in which the bubble domains exist, it is possible to operate systems using lattices with zero bias field, or even negative values of bias field. However, conditions within the area of the lattice are often different than conditions outside the lattice area, which can necessitate using propagation structures in which magnetic bias fields must be provided.

Many propagation structures are known in the prior art, but they are characterized in that the bubble domains are kept at least three bubble domain diameters from one another in order to minimize interactions therebetween. These interactions may cause loss of data or inaccurate sequencing a bubble domains. However, the present invention provides a propagation structure which has only minimum bias field requirements, and in particular has bias field requirements which are compatible with those used for operating confined arrays (such as lattices) of magnetic bubble domains.

Accordingly, it is a primary object of this invention to provide improved means for moving magnetic bubble domains which has minimal bias field requirements.

It is another object of this invention to provide magnetic bubble domain propagation means where magnetic bubble domains can be moved by structure which keeps the bubble domains within interactive distances of one another.

It is a further object of this invention to provide interactive element propagation systems which haave compatible operating characteristics with systems using confined arrays of interactive elements, such as magnetic bubble domains.

It is a still further object of this invention to provide improved means for propagating magnetic bubble domains which utilize very simple structures having minimum associated hardware.

It is another object of this invention to provide improved propagation means for movement of elements which can interact with one another.

It is another object of this invention to provide techniques for moving interactive elements which utilize the interactive properties of these elements.

BRIEF SUMMARY OF THE INVENTION

In accordance with this invention, a propagation means is provided for movement of interactive elements. These interactive elements are elements which tend to repel one another when they are brought sufficiently close to one another that their stray fields interact with one another. A primary example of such elements are magnetic bubble domains, which exhibit stray magnetic fields which interact with one another to cause repulsion of adjacent bubble domains. Another type of interactive element is that which is described in aforementioned copending application Ser. No. 395,336. This second type of interactive element is conveniently a magnetic element which is supported by a carrier material. For instance, the carrier material could be water and the magnetic element will be a styrofoam ball which floats on the water and which contains a permanent magnet therein. By color coding the styrofoam balls, coded information is obtained.

The interactive elements are broadly characterized as exhibiting stray fields which will interact with one another when the elements are brought closely together. Interaction of these stray fields causes mutual repulsion between the elements.

In the following description, magnetic bubble domains will be utilized as an example of an interactive element, although it should be understood that other types of interactive elements can be selected in accordance with the principles described herein.

The present propagation structure includes a confinement means for moving magnetic bubble domains in a row in a magnetic medium in which the magnetic bubble domains exist. The confinement means limits the travel of the magnetic bubble domains to specified directions. The confinement means can be provided by many types of known structures, including etched grooves or ion-implanted regions in the magnetic bubble domain material. Another type of confinement means uses permalloy strips which define guide rails for the movement of magnetic bubble domains. Still another type of confinement means can be provided by current carrying conductors which provide magnetic fields that restrict the movement of magnetic bubble domains to specified directions.

Associated with the confinement means is a pumping means used to produce magnetic fields for expanding bubble domains within the confinement means. Expansion of bubble domains within the confinement means exerts forces on other bubble domains within the confinement means, thereby moving these other bubble domains. When the expansion is terminated, the expanded bubble domains shrink and other bubble domains can move into the areas previously occupied by the expanded domains.

The pumping means can take many forms but is conveniently comprised of current carrying conductors which provide localized magnetic fields that will expand bubble domains intercepted by these magnetic fields. The frequency of operation of the pumping means is determined in accordance with the speed of movement desired by bubble domains within the confinement means. As an example, bubble domains can be readily moved by this technique in a rare earth iron garnet material, using applied pump pulses at frequencies up to about 500 kHz. A range of 100–500 kHz is particularly suitable. Thus, application of a square wave current pulse of this frequency to a current loop pump can be used to move the bubble domains. Further, the bias field normal to the magnetic medium can be modulated during application of the pump pulses, in order to overcome coercivity of the medium. The frequency of the modulating bias field is conveniently 60 cycles/sec.

In some of the embodiments to be shown, a generator is provided at one end of a confinement means for producing bubble domains which can be moved along the confinement means. A pump pulser can be located near the generator for causing expansion of the domains and subsequent propagation of domains along the confinement means.

Various embodiments will be shown for putting bubble domains into the confinement means, and for removing bubble domains from the confinement means. Finally, an embodiment will be shown for utilizing this type of propagation structure in combination with a confined array (lattice) of magnetic bubble domains.

DETAILED DESCRIPTION OF THE PREFERRED EMBODIMENTS

Figure 1:
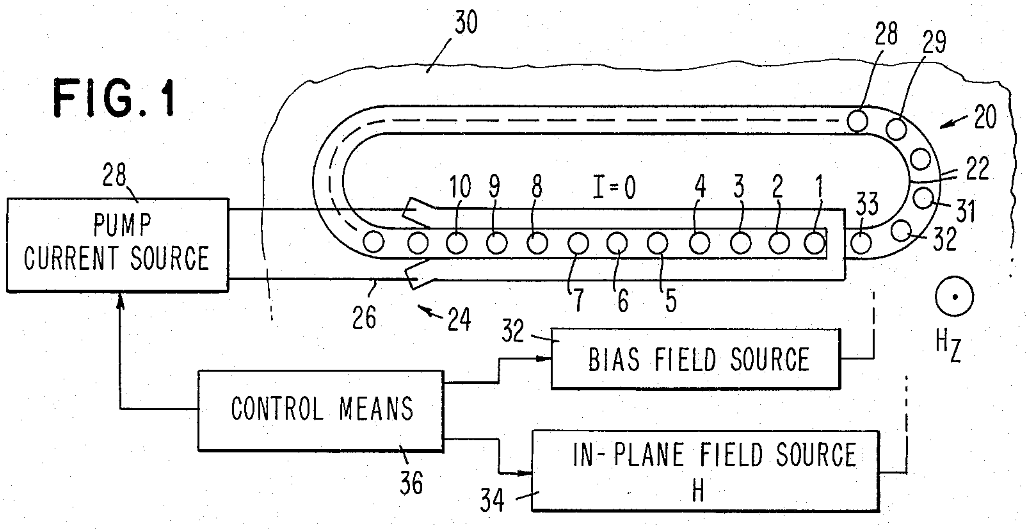
FIG. 1 is a diagram of a bubble domain pump propagation structure for movement of magnetic bubble domains in a magnetic medium.

FIG. 1 shows a closed loop shift register 20 which uses a bubble pump means of propagation. Register 20 is comprised of a confinement means 22 and a pump means generally designated 24. Pump means 24 is typically comprised of a current carrying conductor 26 and a pump current source 28 which is connected to conductor 26.

Bubble domains BD in magnetic medium 30 are constrained for movement by the confinement means 22. That is, confinement means 22 magnetically restrains the bubble domans so that their movement is around a closed loop defined by means 22.

A bias field source 32 is used to provide a bias field $H_z$ normal to magnetic medium 30, while in-plane field source 34 is used to provide a magnetic field H in the plane of medium 30. The pump current source 28, bias field source 32, and in-plane field source 34 operate under control of control means 36 which synchronizes the operation of these various units. In the preferred mode of operation, the magnitude of the fields produced by sources 32 and 34 is variable in accordance with the control signals applied thereto.

In FIG. 1, current I in conductor 26 is zero. The bubble domains in register 20 are numbered to indicate their relative positions with respect to one another. This FIG., together with FIGS. 3A and 3B, will be used to explain propagation of domains within register 20.

CONFINEMENT MEANS (FIGS. 2A-2C)

Figure 2A:
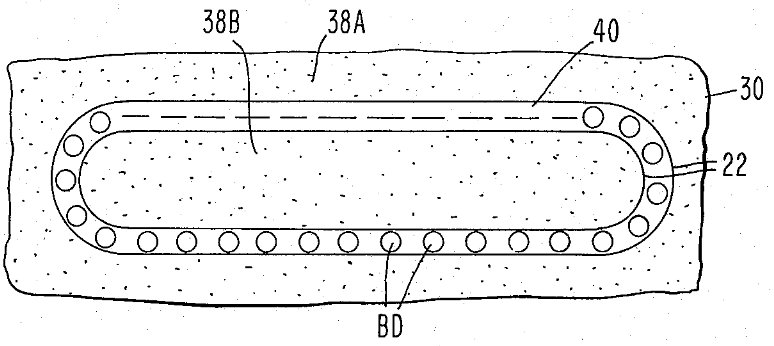
FIGS. 2A, 2B, and 2C show various ways to provide the confinement means in the propagation structure of FIG. 1.

These figures show various means for confining bubble domains for movement in a restricted area. In particular, FIG. 2A shows a confinement means 22 which is produced by ion implanted regions 38A and 38B in magnetic medium 30. The region 40 between these ion implanted regions is the region in which magnetic bubble domains can propagate around the register 20. As is well known in the art, ion implantation affects the magnetic properties of medium 20, creating preferred regions for bubble domain movement. This effect is utilized to provide confinement means for movement of magnetic bubble domains in this embodiment.

Figure 2B:
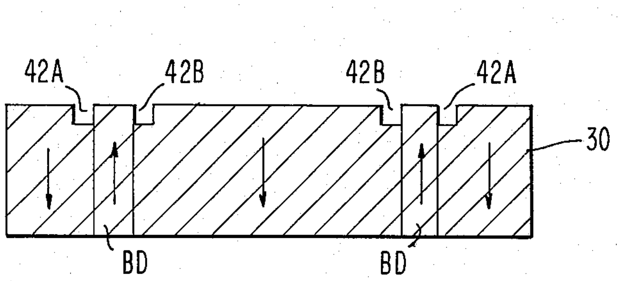

In FIG. 2B, magnetic medium 30 has grooves 42A and 42B therein. These grooves define a closed loop for preferred propagation of bubble domains BD. In this drawing, groove 42B defines an inner loop within an outer loop defined by groove 42A. As is well known in the art, grooves in a magnetic medium provide magnetic areas which can be used to control the propagation of bubble domains therein. This principle is utilized for the confinement means 22.

Figure 2C:
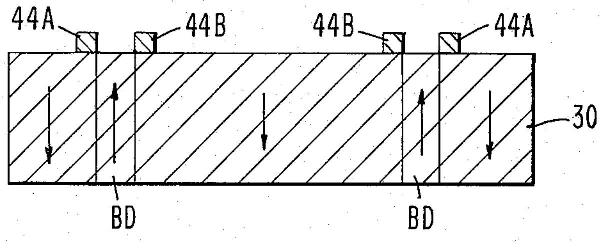

In FIG. 2C, magnetic medium 30 has magnetically soft material 44A and 44B adjacent thereto. This magnetic material can be permalloy or other well known magnetically soft materials. It can be deposited directly on magnetic medium 30 or spaced therefrom by an insulation layer.

Permalloy strip 44B is a closed loop located within an outer loop defined by permalloy 44A. In this manner, bubble domains BD will move between the permalloy regions as is known in the prior art.

Although it is not shown herein, the confinement means could also be provided by conductor patterns in the manner more fully described in aforementioned copending application Ser. No. 395,336. As another variation, permalloy strips 44A and 44B do not have to be continuous strips, but rather can be discrete segments of permalloy which define the confinement means 22.

BUBBLE DOMAIN PUMP MEANS

Although the pump means is conveniently comprised of current carrying conductors, any type of means which provides localized magnetic fields can be utilized. For instance, soft magnetic materials can be magnetized by an in-plane magnetic field to provide localized magnetic fields normal to the plane of magnetic medium 30. These localized magnetic fields will expand or contract magnetic bubble domains in the vicinity thereof, and can be used for propagation of bubble domains in the manner to be described hereinafter.

OPERATION OF THE PUMP PROPAGATION REGISTER

Figure 3A:
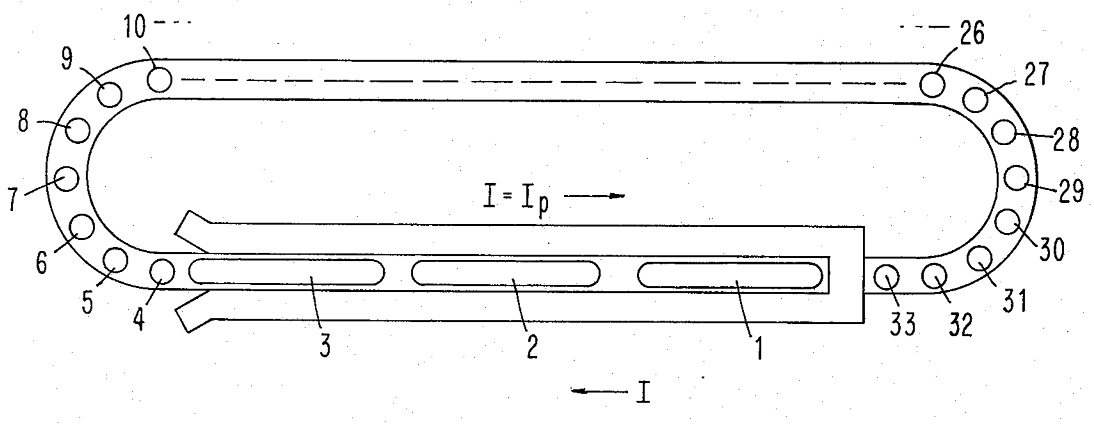
FIGS. 3A and 3B illustrate the operation of the pump propagation means of FIG. 1.

Operation of the shift register of this invention will be described with reference to FIGS. 1, 3A, and 3B. Peripheral components, such as the field sources 32 and 34, are omitted from FIGS. 3A, 3B to simplify these figures. In more detail, FIG. 1 shows the situation in which register 20 is loaded with bubble domains BD and no current I flows in conductor loop 26. For propagating magnetic bubbles within closed loop 20, a current $I = I_P$ is applied to conductor 26 in the direction indicated in FIG. 3A. In this FIG., the current in conductor 26 causes the magnetic bubble domains (1, 2, 3) within the area defined by conductor loop 26 to expand. As these bubble domains expand, other bubble domains 4, 5, 6, . . . , will be forced out of the open end of the conductor loop 26 while bubble domains 33, 32, 31, . . . are held in their positions by the field produced by current $I_P$ (FIG. 3A).

Figure 3B:
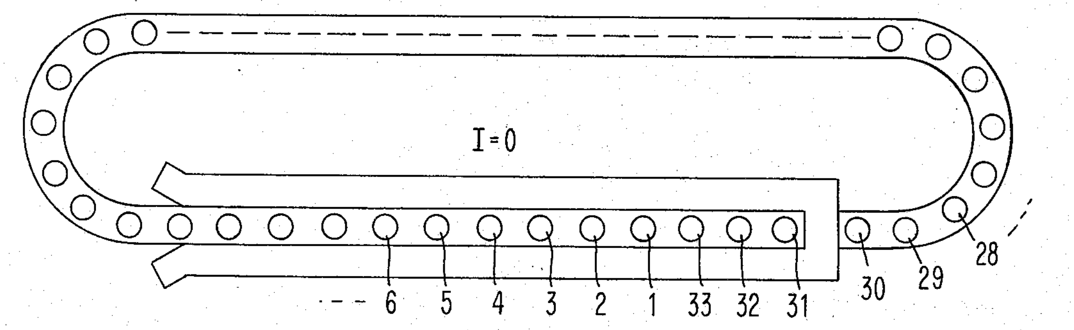

Current $I_P$ in loop 26 is then reduced to zero, which will cause bubble domains within the area of loop 26 to shrink (FIG. 3B). As these bubble domains shrink, the held bubble domains 33, 32, 31, . . . will enter the area defined by conductor loop 26, thus resulting in a net clockwise displacement of bubble domains within the closed loop register.

Since the bubble domains BD in register 20 are packed very closely together, this register may be operated at very low values (or zero values) of bias field $H_z$. It is this feature which makes it possible to operate this pump shift register under the same bias field conditions required for the storage of bubble domains in a bubble domain lattice, as is more fully shown and described in aforementioned copending application Ser. No. 395,336.

The frequency of the applied pump pulses for bubble domain propagation can be from essentially D.C. (i.e., very low frequencies) to about 500 kHz for typical rare earth iron garnet bubble domain materials. Also, a small time modulated magnetic field substantially normal to the easy axis of magnetization of the bubble domain material can be applied to aid in overcoming coercivity of the magnetic medium. For instance, the stabilizing bias field $H_z$ can be about 20 Oe, while the time modulated field is about 5 Oe, being applied at a frequency of about 60 cycles per sec.

As an example of bubble domain propagation using this pump, a closed loop containing 40 bubble domains of 5 micron diameter, having a spacing of about 2 diameters center-to-center, were propagated by applying current pulses to a pump conductor. The amplitude of the current pulses was about 80 ma, and the applied frequency was very low, in order to be able to visually observe the movement of the bubble domains. The bias field $H_z$ was about 20 Oe in this example.

Alternatively, the pump pulse can initially be applied in a direction which causes some of the domains to shrink, rather than to expand. When this is done, other domains 33, 32, 31 will move to the regions of the magnetic medium vacated by the shrunk domains, and propagation will continue as the shrunk domains then expand.

This pump propagation means has domains confined in it which can interact with each other, but which are not so tightly packed as to allow no breathing room for expansion/shrinking, etc. Further, the applied bias field $H_z$ is not so great as to cause spontaneous collapse of domains in the propagation means or run-out of these domains. As mentioned previously, the applied bias field can be small, since the domains within the propagation means can be placed closely enough to interact with each other, which provides self-biasing for the interacting domains. In applications where the domains are not close to one another, the field $H_z$ can be larger.

This propagation means provides bubble domain movement without restricted tolerance levels on applied pump pulses or bias fields. Additionally, propagation around corners can be obtained, and this is especially facilitated if the corners are smooth, rather than having sharp angles therein.

INPUT/OUTPUT OF BUBBLE DOMAINS FROM THE PUMP REGISTER (FIGS. 4–9)

FIGS. 4–9 show various techniques for placing bubble domains into the pump register 20 and for removing bubble domains therefrom. In addition to the embodiments shown in these figures, other techniques for achieving these functions will be shown in FIG. 10.

Figure 4:
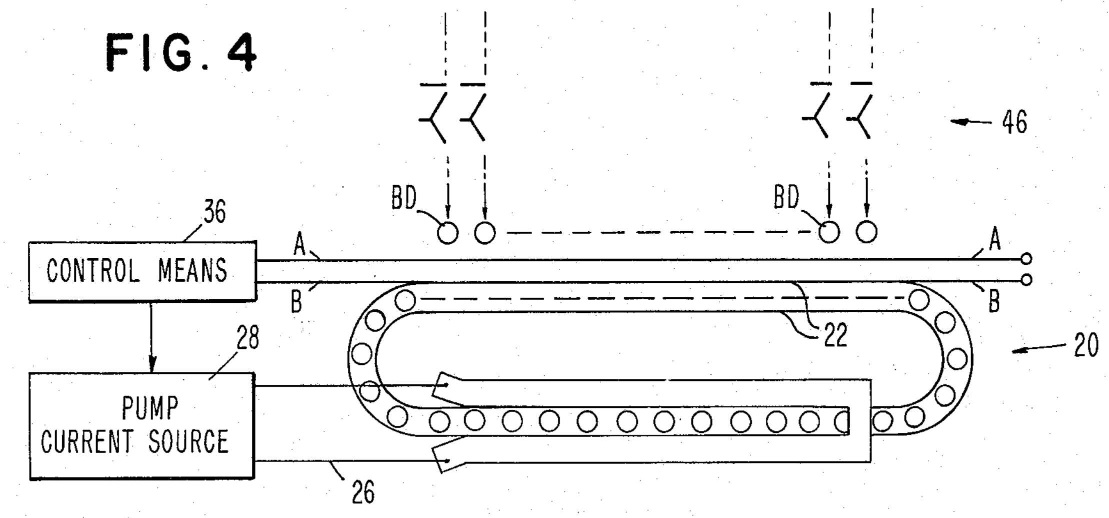
FIG. 4 shows a pump propagation means and structure for moving domains into this propagation means.

FIG. 4 shows a technique for moving magnetic bubble domains into register 20. In particular, the principles described in aforementioned copending application Ser. No. 395,336 can be utilized to overcome the repulsive barrier presented by the confinement means 22, in order to place bubble domains into register 20.

In more detail, a plurality of propagation paths 46 are shown for moving magnetic bubble domains toward register 20. In this particular embodiment, Y and I-bars are shown for moving magnetic bubble domains BD to the vicinity of conductors A and B. These conductors are located near one side of register 20 and will be pulsed sequentially to move magnetic bubble domains downwardly into the propagation structure 20.

The pump current source 28 and current loop 26 also aid in the injection of bubble domains into the register 20. In operation, bubble domains which are moved into the vicinity of conductors A and B will move downwardly into register 20 in response to current pulses applied in conductors A and B. Currents in these conductors will create magnetic field gradients which pull and push magnetic bubble domains through the barrier represented by confinement means 22. Thus, any type of propagation means can be used to bring bubble domains to positions adjacent register 20, after which current pulses in conductors A and B are provided to overcome the repulsive force of confinement means 22 in order to insert these bubble domains into register 20.

During the input operation, it may be advantageous to put current pulses in conductor 26 to expand and contract domains located within the area of loop 26. This eases the movement of bubble domains into register 20, since the repulsive forces of domains already within register 20 will be minimized.

Figure 5:
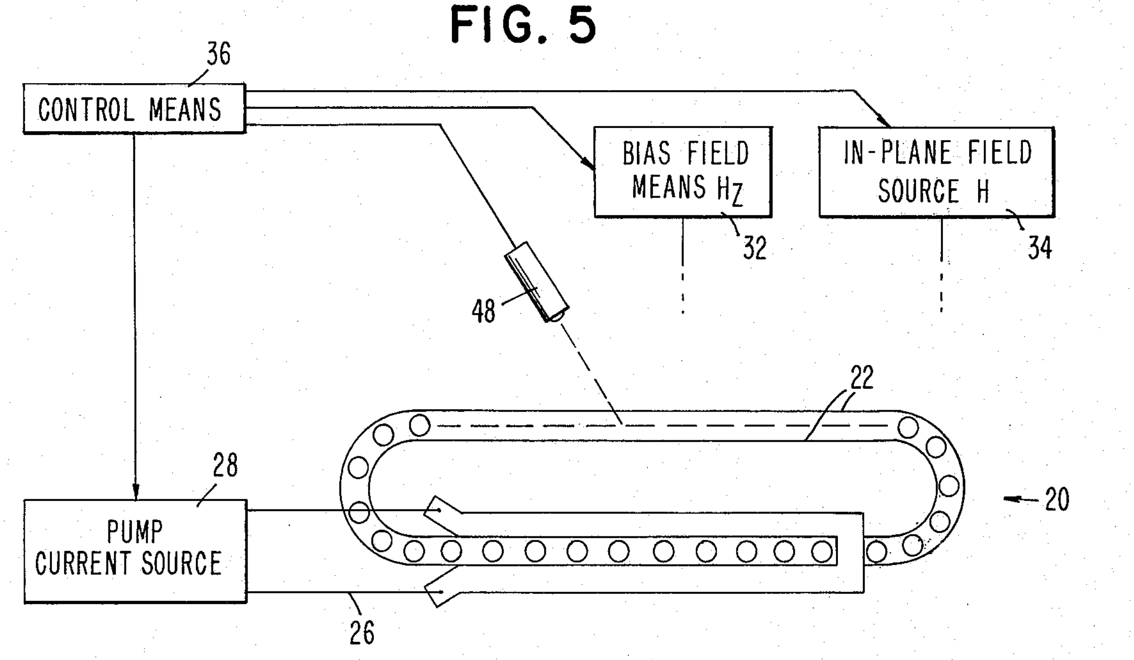
FIG. 5 shows a pump propagation means and a different structure for providing bubble domains within the propagation means.

FIG. 5 shows an embodiment for thermally writing magnetic bubble domains in register 20. As is known in the art (U.S. Pat. No. 3,506,974), magnetic bubble domains can be generated in a magnetic medium in response to the application of heat pulses thereto. Additionally, magnetic bias fields $H_z$ can be used in combination with this heat in order to locally generate magnetic bubble domains. Accordingly, a heat source, shown herein as a laser 48, is used in combination with magnetic fields produced by sources 32 and 34 for writing domains into register 20.

As in the embodiment of FIG. 4, it may be advantageous to expand and contract domains within register 20 by providing current pulses in conductor 26. This moves magnetic bubble domains in register 20, allowing more easy nucleation of domains therein.

Figure 6:
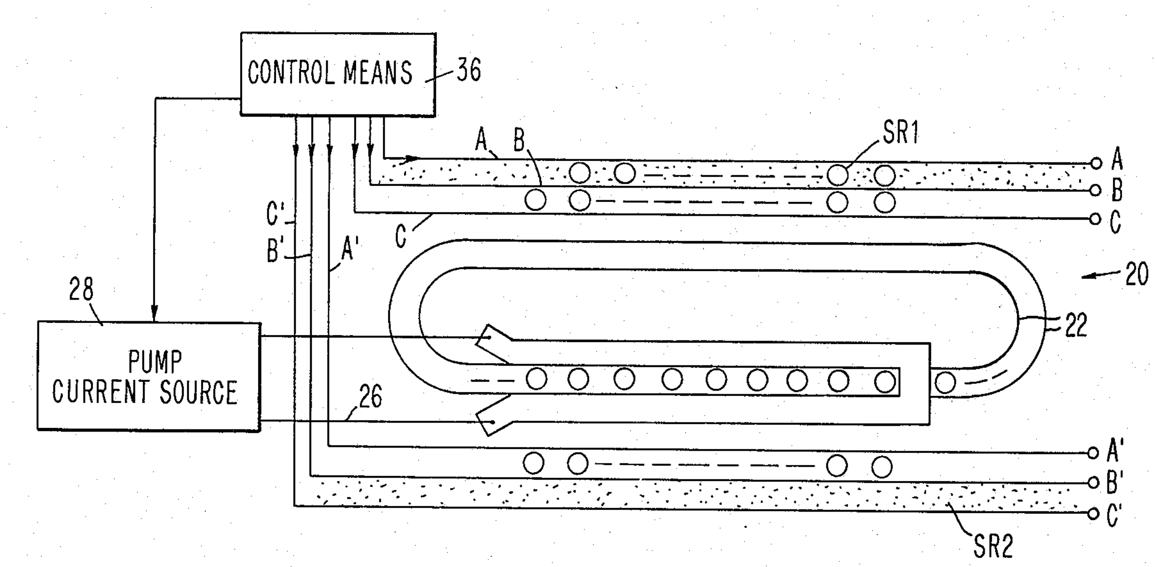
FIG. 6 shows an alternate structure for moving domains into and out of a pump propagation structure in accordance with the present invention.

FIG. 6 shows still another embodiment for putting domains into a pump propagation register 20. The input means is comprised of conductors A, B and C, while the output means for removing domains from register 20 is comprised of conductors A′, B′ and C′. Pump current source 28 is provided to pump conductor 26 in the manner previously described. A control means 36 provides inputs to pump current source 28, as well as to input conductors A, B and C. Additionally, control means 36 provides synchronized current inputs to conductors A′, B′ and C′.

Figures 8, 9:
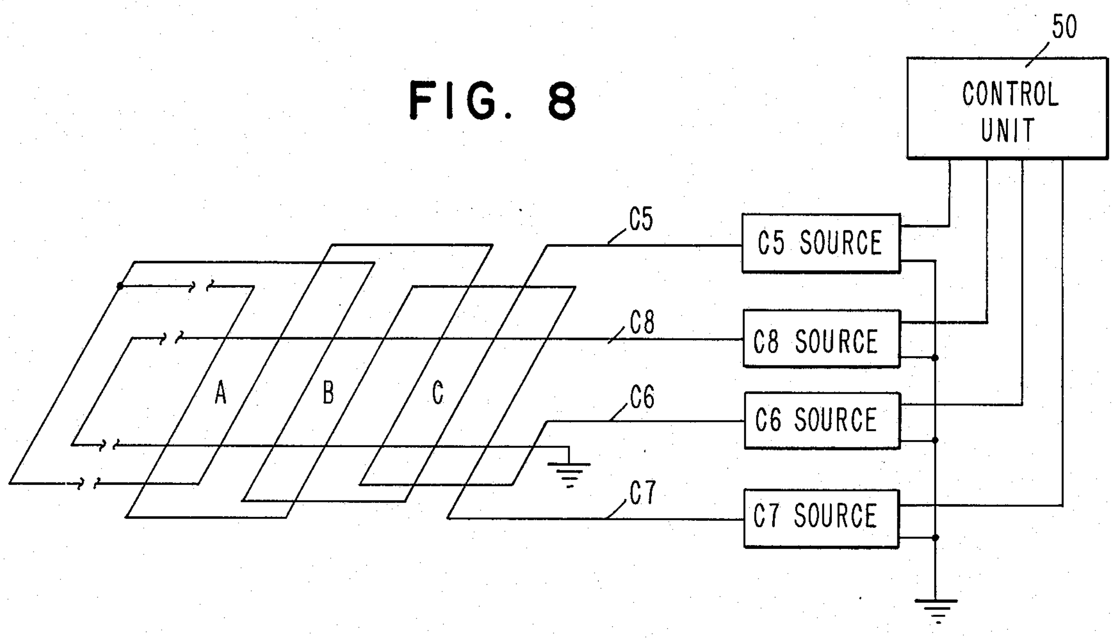
FIG. 8 shows a shift register which can be suitably used in combination with the structure shown in FIG. 6.
FIG. 9 shows the sequence of applied time pulses in the shift register of FIG. 8, for movement of bubble domains by this shift register.

In operation, bubble domains BD are moved along a shift register designated SR1, which is located in the region between conductors A and B. A structure for realizing such a register with current carrying conductors is shown in FIG. 8. This register moves the bubble domains until they are in a proper location outside register 20. At this time, appropriate pulse sequences in conductors A, B and C move the bubble domains downwardly into register 20. If desired, current pulses can be provided in conductor loop 26 for moving bubble domains already in register 20, in order to facilitate the injection of other bubble domains into register 20.

The output means for removing bubble domains from register 20 is similar to the input means. In particular the output means comprises conductors A′, B′ and C′. Synchronized current pulses on these conductors will create magnetic field gradients which remove bubble domains from the adjacent portion of register 20. These removed bubble domains will be moved to a shift register SR2 between conductors A′ and B′. This register, which can also be the type shown in FIG. 8, is then used to move the bubble domains to other parts of the magnetic medium in which they exist.

Figure 7A:
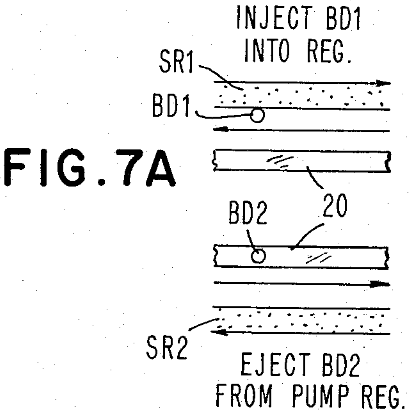
FIGS. 7A–7D illustrate the operation of the structure of FIG. 6, for movement of magnetic domains into and out of the pump propagation structure of FIG. 6.
Figure 7B:
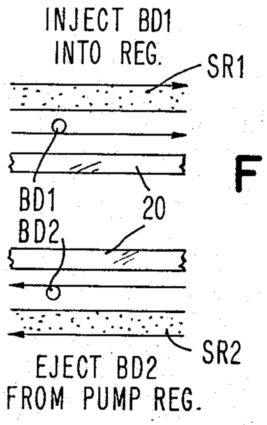
Figure 7C:
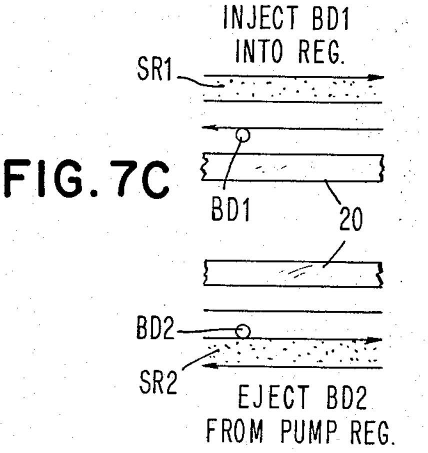
Figure 7D:
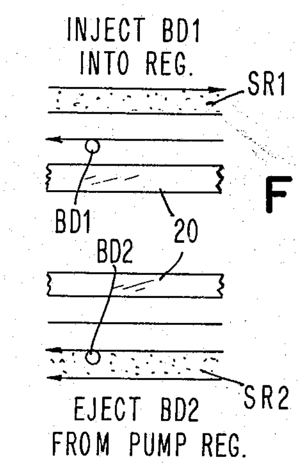

FIGS. 7A-7D illustrate the currents present in conductors A, B, C, A′, B′, and C′ in order to move domains into and out of the register 20. In particular, FIG. 7A refers to the situation at time T = 1, FIG. 7B shows the situation at time T = 2, FIG. 7C shows the situation at time T = 3, and FIG. 7D shows the situation at time T = 4. The conductors A-C are used to move bubble domain BD1 into shift register 20 while conductors A′–C′ are used to move bubble domain BD2 out of register 20.

The appropriate currents in the conductors are designated by the arrows on these conductors. From these figures, it is apparent that BD1 moves downwardly into register 20 while domain BD2 moves out of register 20 during the sequence of pulses applied to conductors A′–C′. Since the input conductors A–C are disposed with respect to register 20 in the same manner as are conductors A′–C′, reverse currents in these conductors can be used to move domains BD1 and BD2 in opposite directions.

The pulse amplitudes and durations in the various input and output conductors are not critical. For instance, currents of about 50 milliamps can be used in conductors B, C, B′ and C′, while currents of about 25 milliamps can be used in conductors A and A′. The pulse durations for movement of the domains are not critical, and depend on how fast the domains will move in a given bubble domain material. For instance, pulses of duration about 0.3 microseconds or greater are suitable for most rare earth iron garnet bubble domain materials.

In FIGS. 6 and 7A–7D, the conductors A, B, C and A′, B′, C′ are spaced further from confinement means 22 than they are in FIG. 4. This was done to prevent crowding in FIGS. 6, 7A–7D, in order to be able to more clearly illustrate bubble domain motion. In practice, the conductors, A, B, C and A′, B′, C′ would be closer to confinement means 22, in order to be able to insert/remove bubble domains into/from the propagation means 20.

FIG. 8 shows on period of a conductor pattern suitable for the shift registers SR1 and SR2. This register is comprised of conductors C5, C6, C7, and C8. Conductors C5, C6 and C7 provide a three-phase conductor propagation pattern, while conductor C8 is a loop which serves as a guide rail to keep bubble domains BD in the proper propagation track.

Conductors C5–C8 are connected to current sources as shown. These current sources receive inputs from a control unit 50.

Sequential positions of a bubble domain during one cycle of shift register operation are designated A, B and C in FIG. 8. FIG. 9 shows the different currents used during one cycle of shift register operation to move a bubble domain from position A to position B to position C. In this FIG., a plus sign indicates that a current is flowing into the indicated conductor. This current divides equally and returns through the propagation conductors defined by the symbol G in FIG. 9. For instance, a bubble domain will move from position A to position B when conductors C5 and C7 are grounded and conductors C6 and C8 have currents in them.

Other techniques exist for initializing the domains within the pump propagation means. For instance, an in-plane field can be used to generate uniform strip-like domains which extend transversely to the register 20. A large in-plane magnetic field of approximately 500 Oe can be used to provide a field of strip-like domains. These domains will form in the direction of the in-plane field and can be cut using current pulses in the pump conductor. Additionally, these cut domains can be moved by smaller values of current pulses in the pump conductor.

As another technique for initializing domains in the pump propagation structure, an array of bubble domains can be formed by providing an in-plane magnetic field of several thousand Oe. This magnetic field is then reduced to a zero value which will produce an array of magnetic bubble domains. A small modulated bias field $H_z$ will then oscillate the array to produce a lattice of bubble domains, some of which will be located in the bubble pump register. All of these bubble domains in the register are then forced together by applying a high current to the pump conductor, which will create a single strip domain in the register. After this, additional domains can be fed one at a time into the register by a current carrying conductor loop or can be split from this initial domain. These input domains are counted to provide a pump structure 20 having a specified number of bubble domains therein.

BUBBLE PUMP AND LATTICE (FIG. 10)

Figure 10:
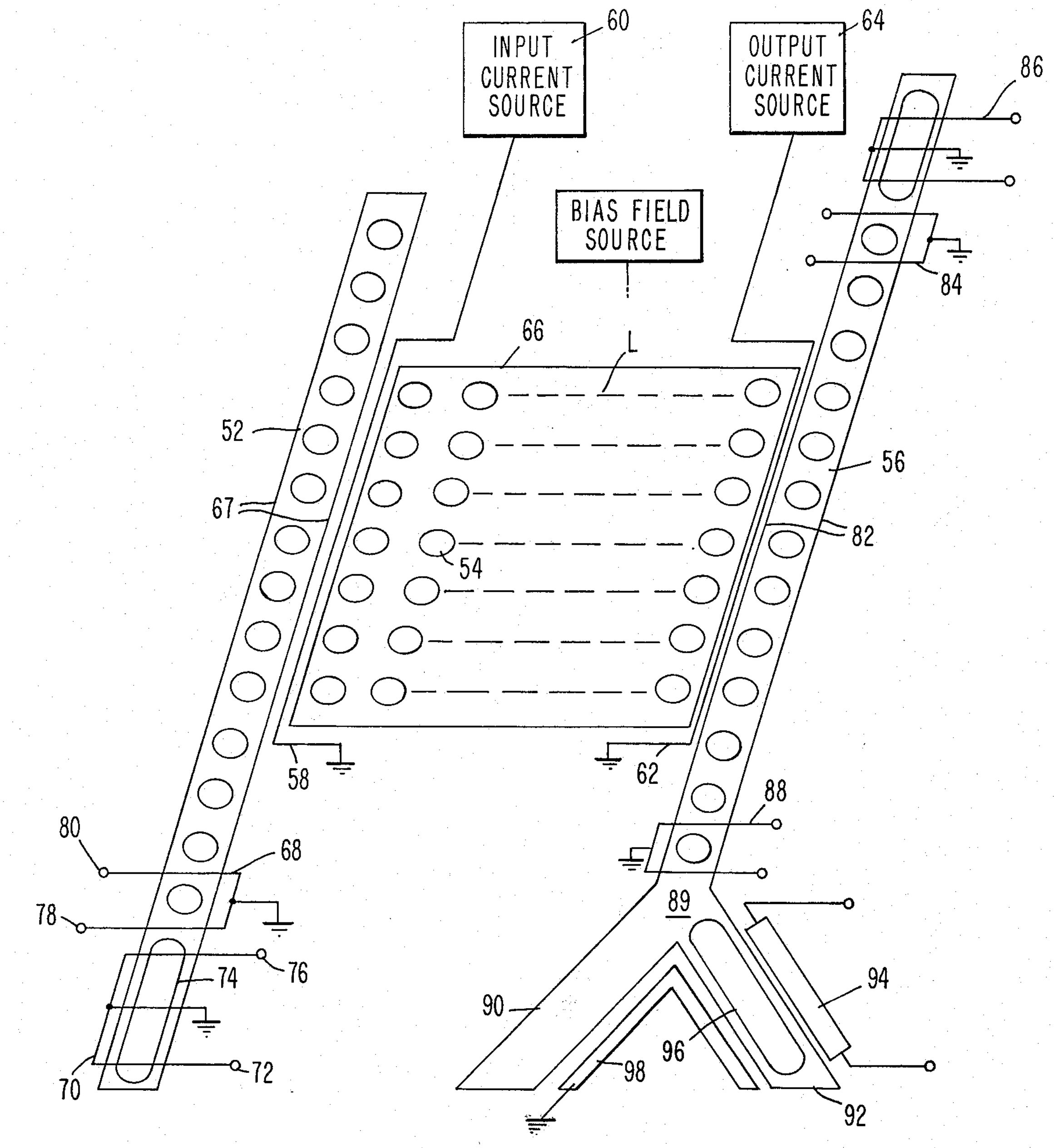
FIG. 10 shows a lattice array of confined elements used in combination with bubble domain pump propagation means, for provision of information handling systems.

FIG. 10 shows bubble pump structures in combination with a lattice of magnetic bubble domains. In this diagram, an input pump 52 is used to provide magnetic bubble domains which are inserted into the lattice L of bubble domains 54. An output pump 56 is used to receive and propagate bubble domains which are removed from lattice L.

An input means shown schematically as conductor 58 is used to move domains from pump 52 into lattice L. Conductor 58 is connected to input current source 60.

The output means for transferring bubble domains out of lattice L is schematically shown as conductor 62 which is connected to output current source 64. The means for moving domains into and out of the lattice L are well described in aforementioned copending application Ser. No. 395,336. In operation, these input/output means overcome the barrier forces provided by the confinement structure 66 which surrounds lattice L. Confinement 66 is provided by the techniques shown for example in FIGS. 2A–2C. Therefore, the input means and output means can be conductor patterns as shown in FIG. 6. For ease of drawing, they are schematically shown as single conductors in FIG. 10.

Input pump 52 is comprised of a confinement means 67, a bubble domain pusher 68, and a bubble domain generator 70. Generator 70 is conveniently an M-shaped conductor pattern whose middle leg can be grounded while the outer two legs are connected to current sources. This generator can be used to nucleate bubble domains and also to split bubble domains from an initially nucleated domain. The split domains are then moved by pusher 68 in a direction toward the lattice L.

To nucleate a bubble domain in register 52, a current of about 300–400 milliamps is applied to terminal 72 of generator 70. The bias field during this operation is that which exists in the lattice L ($H_z \approx 0$). The localized magnetic field produced by current applied at terminal 72 nucleates a domain in the region of generator 70. This domain can be stretched to provide an elongated bubble domain 74 by inserting current in terminals 72 and 76 of generator 70. This current is approximately 100 milliamps for usual bubble domain garnet materials. This current stretches the bubble domains and causes a pinching action to take place at the center of the stretched domain 74. Consequently, the domain splits. A current of approximately 10 milliamps applied at terminal 78 of pusher 68 will attract a split domain to a position near pusher 68. At this time, a current inserted at terminal 80 of pusher 68 will hold a bubble domain in the region of the conductor connected to this terminal.

Pusher 68 advances one bubble domain at a time toward lattice L. By sequentially applying current to the two terminals of pusher 68, bubble domains will be propagated toward lattice L. When these domains are properly located with respect to the various rows of domains within lattice L (which can be achieved by providing small deposits of permalloy or etched recesses in the bubble domain material to define input positions) the input current source 60 is operated to transfer these domains into the lattice L.

When a column of domains is inserted into lattice L, this force is transmitted through the lattice and a column of domains will be pushed from the output end of the lattice into pump 56. To aid this operation, current from source 64 flows in the output conductors 62.

Output pump structure 56 is comprised of a confinement means 82 and a bubble domain serial pusher 84. In addition, a nucleator and bubble splitter 86 is provided. Pusher 84 and nucleator/splitter 86 are essentially the same as those (68 and 70, respectively) described previously. They are used to generate domains and to move them one at a time into register 56.

When domains have been removed from lattice L, they are forced downwardly to the U-shaped pusher 88. This pusher operates identically to the previously described pushers and will move bubble domains in a serial fashion into the Y-shaped portion 89 of register 56. Current through pusher 88 is sufficient to provide a magnetic field gradient at the Y region of register 56. Domains entering this gradient field will be deflected into either path 90 or 92 depending upon the wall rotation state of the domains. This type of coding is known in the art and is more particularly described in aforementioned Ser. No. 395,336, as well as in Ser. No. 375,285, filed June 29, 1973. A bubble domain sensor 94 is used to detect domains 96 which are in flux coupling proximity to it in accordance with known principles.

Conductor 98 is connected to a current source (not shown) which provides current to produce an expanded domain 96 which is sensed by sensor 94. After sensing, the current in conductor 98 is reversed and increased in value to collapse domain 96. If there are domains in leg 90 of the register, current in conductor 98 can be used to collapse them also.

The generator 70 can be used to cut magnetic bubble domains in the manner described in aforementioned Ser. No. 395,336 and Ser. No. 375,285 in order to provide the desired vertical Bloch line states of domains if this type of coding is used. Therefore, coding is provided for bubble domains which are used as information storage elements in the lattice L. Of course, the domains within lattice L do not have to be coded in order to have utility in some systems. In this case, the generator 70 merely provides bubble domains for insertion into the lattice L.

The operation of pusher 68 and generator/splitter 70 to provide bubble domains in a pump shift register can be utilized to initialize domains in the closed loop shift register 20 of FIG. 1. To do so, a pusher and generator/splitter would be used in addition to the pump conductor 26.

What has been described is a bubble domain pump propagation means which requires a minimum of hardware and is compatible with varying magnetic bias field conditions. Depending upon the closeness of bubble domains to one another in the pump propagation means, the magnetic bias field $H_z$ can be varied between that used in conventional bubble domain devices and that used in lattice arrangements of bubble domains. Accordingly, the applied bias field $H_z$ can be zero (or some small negative value) or a larger value in accordance with design operations. Thus, for pump propagation means where bubble domains are quite far apart (minimum interaction) higher bias fields may be required while for pump propagation means having closely packed magnetic bubble domains, small magnetic bias fields can be used. Generally, the magnetic bias field will be adjusted so that collapse of bubble domains will not occur spontaneously in the propagation structure.

Interactive elements other than magnetic bubble domains can be moved by this propagation means. For instance, the styrafoam magnetic elements can have their spacing changed locally by pump pulses, in order to move them in the confinement means.

This pump propagation means is particularly suitable for use with lattice files in which bubble domains are confined to regions where they interact with one another. However, it is possible to utilize the present propagation structures as shift registers or as other devices, as will be apparent to those of skill in the art.

What is claimed is:

1. A propagation means for moving elements which have stray fields associated therewith, comprising:

means for confining said elements in a channel, means for holding at least one of said elements in said channel in a substantially fixed position, means for changing the size of elements in said channel while said at least one element is held in said substantially fixed position to cause interactions between elements in said channel which propagate said elements along said channel when said at least one element is released from its substantially fixed position.

2. The means of claim 1, where said elements are magnetic bubble domains.

3. The means of claim 2, where said means for changing includes means for producing a magnetic field which intercepts bubble domains in said channel.

4. The means of claim 1, where said means for changing includes means for producing an electromagnetic field acting on said elements.

5. The means of claim 1, where said means for confining includes means for magnetically interacting with said elements.

6. The means of claim 2, further including bias means for providing a magnetic bias field for stabilizing the size of said bubble domains.

7. A bubble domain pump propagation structure for moving magnetic bubble domains in the magnetic medium, comprising:

confinement means for restraining magnetic bubble domains in a restricted area of said magnetic medium in which said confined bubble domains can interact with one another, pump means for locally crowding said bubble domains in said confinement means to produce interaction forces on all bubble domains within said confinement means and for relaxing said local crowding, holding means for holding the position of at least one bubble domain in said restricted area substantially fixed during said local crowding when interaction forces are exerted on said at least one bubble domain, and for releasing said at least one bubble domain during said relaxing of said local crowding.

8. A bubble domain propagation structure for moving magnetic bubble domains in a magnetic medium, comprising:

a confinement means for restricting the motion of bubble domains therein to a single dimension to form a channel, blocking means for magnetically blocking bubble domain movement along said dimension, and pump means for applying a magnetic field to selected bubble domains in said confinement means for expanding said selected bubble domains to cause interactions between domains in said channel while said blocking means prevents bubble domain movement along said dimension, means for releasing said blocked bubble domains after said pump means has expanded said selected bubble domains.

9. A propagation structure for moving magnetic bubble domains comprising:

confinement means for defining a restrictive channel for magnetic bubble domain movement, there being a plurality of magnetic bubble domains in said channel having an equilibrium distance $a_0$ between said domains, force means for applying magnetic forces to selected bubble domains for moving bubble domains in said channel closer than said equilibrium distance $a_0$, means for removing said magnetic forces from said selected domains to allow said bubble domains to move toward establishing said equilibrium distance $a_0$ therebetween, holding means for preventing the movement of at least one bubble domain in said channel while said force means applies said magnetic forces and for releasing said at least one domain when said means for removing removes said magnetic forces from said selected domains.

10. A bubble domain system comprising:

first confinement means for confining an array of magnetic bubble domains which can interact with one another to form a lattice of bubble domains within said confinement means, access means for accessing bubble domains at positions within said first confinement means, said access means including:

second confinement means for confining magnetic bubble domains in a channel wherein said bubble domains in said channel can move in either of two opposing directions substantially determined by the geometry of said second confinement means, and pump means for producing a magnetic field which couples to selected bubble domains in said channel to change the size of said selected domains thereby producing bubble-bubble interaction forces on all bubble domains in said channel, and for removing said magnetic field to allow said selected domains to relax toward their original sizes, holding means for holding at least one bubble domain in said channel in a substantially fixed position during application of said magnetic field to said selected domains, said at least one bubble domain being held in said substantially fixed position even when an interaction force is exerted on it by another bubble domain in said channel.

11. A shift register for moving magnetic bubble domains in a magnetic medium, comprising:

a confinement means for providing magnetic interactions with a single row of magnetic bubble domains to confine said row of bubble domains, said domains beng able to move in said confinement means only in directions determined by the geometry of the confinement means, pump means for applying a magnetic field to a plurality of selected bubble domains within said confinement means for simultaneously changing the size of said plurality of selected bubble domains coupled by said magnetic field to thereby change the interactions between said selected bubble domains, and for substantially reducing the magnitude of said applied magnetic field to allow said selected bubble domains to relax from their changed size, holding means for holding at least one bubble domain at a substantially fixed position in said confinement means while the sizes of said selected domains are changed, and for releasing said at least one domain when said selected domains relax.

12. The shift register of claim 11, further including generating means located adjacent to said confining means for generating magnetic bubble domains therein.

13. The shift register of claim 11, further including control means for producing localized magnetic field for movement of one bubble domain at a time in said confinement means.

14. A method for moving magnetic bubble domains in a magnetic medium, comprising:

confining said bubble domains within said medium in a restricted area of said medium, applying an electromagnetic field to at least one of said confined bubble domains in order to change the size of said at least one confined bubble domain to modify the interaction between said at least one bubble domain and another bubble domain in said restricted area, holding one other of said bubble domains in said restricted area in a substantially fixed position while the size of said at least one bubble domain is changed, and removing said appliied electromagnetic field to allow said at least one bubble domain whose size has been changed to relax toward its original size and releasing said one other bubble domain from its substantially fixed position said domains in said restricted area then moving due to interactions between said domains.

15. The method of claim 14, where said confined bubble domains are substantially close to one another to interact with one another.

16. The method of claim 14, including the further step of detecting said domains which are confined.

17. The method of claim 14, wherein said electromagnetic field is applied in a direction to expand said confined domains.

18. A propagation structure for moving magnetic bubble domains in a magnetic medium, comprising:

a confinement means for containing the motion of said bubble domains in a restricted direction in said magnetic medium, said bubble domains being sufficiently close to one another in said confinement means to have interaction therebetween, pump means for changing the size of a first bubble domain within said confinement means to produce interaction forces between all domains in said confinement means and for allowing said first domain having a changed size to relax toward its original size, holding means for holding at least one of said bubble domains in a substantially fixed position while said first domain has its size changed and for releasing said at least one domain when said first domain relaxes toward its original size.

19. The structure of claim 18, where said pump means includes means to produce magnetic fields which couple to said domains in said confinement means.

20. The structure of claim 18, where said confinement means contains a single row of magnetic bubble domains therein.

21. The structure of claim 18, where said pump means includes a current-carrying conductor for producing magnetic fields which couple to domains in said confinement means.

22. The structure of claim 18, further including input means for producing bubble domains in said confinement means.

23. The structure of claim 18, further including output means for removing bubble domains from said confinement means.

24. The structure of claim 18, including means for detecting domains in said confinement means.

25. A system for manipulation of magnetic bubble domains in a magnetic medium, comprising:

a lattice of magnetic bubble domains spaced sufficiently close to one another to have interactions therebetween, said bubble domains in said lattice being in positions substantially determined by said interactions, a bubble domain pump propagation structure located adjacent to said lattice, said pump structure including confinement means for confining magnetic bubble domains to move in a direction substantially determined by the geometry of said confinement means, and pump means for producing magnetic fields which couple to said magnetic bubble domains in said confinement means to change the size of said coupled bubble domains and for allowing said bubble domains having changed size to relax toward their original sizes.

26. The system of claim 25, where said pump means locally expands domains in said confinement means.

27. The system of claim 25, further including a magnetic bias source for producing a stabilizing bias field on said magnetic domains.

28. The system of claim 25, further including holding means for restricting the motion of at least one bubble domain in said confinement means while said pump means changes the size of said coupled bubble domains.

29. A bubble domain pump propagation structure, comprising:

confinement means for restricting a row of bubble domains therein which are sufficiently close to one another to interact with a force $F_1$ between adjacent bubble domains, pump means for altering said interaction to locally change the interactive force between adjacent domains to a new value $F_2$, and for returning said interactive force to approximately the value $F_1$, holding means for restricting the movement of at least one bubble domain in said confinement means while said interactive force is changed from $F_1$ to $F_2$, and for releasing said at least one bubble domain when said force $F_2$ is relaxed toward the value $F_1$.

30. The structure of claim 29, where said pump means and said holding means are comprised of the same structure.

* * * * *